United States Patent
Gopalan et al.

(10) Patent No.: US 10,239,083 B2
(45) Date of Patent: Mar. 26, 2019

(54) COMPACT SPLIT-LIP SHEAR WASHER NOZZLE

(71) Applicant: dlhBowles, Inc., Canton, OH (US)

(72) Inventors: Shridhar Gopalan, Westminster, MD (US); Chunling Zhao, Ellicott City, MD (US); Andrew Cameron, Silver Spring, MD (US)

(73) Assignee: dlhBowles, Inc., Canton, OH (US)

( * ) Notice: Subject to any disclaimer, the term of this patent is extended or adjusted under 35 U.S.C. 154(b) by 0 days.

(21) Appl. No.: 15/433,883

(22) Filed: Feb. 15, 2017

(65) Prior Publication Data

US 2018/0029566 A1 Feb. 1, 2018

Related U.S. Application Data

(63) Continuation of application No. PCT/US2015/045429, filed on Aug. 15, 2015.
(Continued)

(51) Int. Cl.
*B60S 1/52* (2006.01)
*B60S 1/56* (2006.01)
(Continued)

(52) U.S. Cl.
CPC .............. *B05B 15/68* (2018.02); *B05B 1/04* (2013.01); *B05B 1/046* (2013.01); *B05B 1/10* (2013.01);
(Continued)

(58) Field of Classification Search
CPC ...... B60S 1/46; B60S 1/52; B60S 1/56; B60S 1/58; B60S 1/60; B60S 1/603;
(Continued)

(56) References Cited

U.S. PATENT DOCUMENTS

| 4,151,955 A | 5/1979 | Stouffer |
| 4,463,904 A | 8/1984 | Bray, Jr. |

(Continued)

FOREIGN PATENT DOCUMENTS

| DE | 102007009728 A1 | 9/2008 |
| WO | WO80/00927 | 5/1980 |

(Continued)

OTHER PUBLICATIONS

International Search Report in corresponding International Patent Application No. PCT/US15/45429, dated Dec. 31, 2015.
(Continued)

*Primary Examiner* — Darren W Gorman
(74) *Attorney, Agent, or Firm* — McDonald Hopkins LLC

(57) ABSTRACT

A very compact nozzle assembly 100, 200, 300 and spray head for an automotive washer nozzle is configured for inclusion into an automotive trim component. The compact nozzle assembly and spray head generate a very effective cleaning spray at a selected spray fan angle, yaw angle and roll angle and, in an exemplary embodiment, the spray fan is dual shear shaped, producing an even distribution, which may be varied from 30° to 120°. Spray head may be as small as 5 mm in diameter and be aimed to provide a spray with various spray aim, yaw and roll angles. The design accounts for better mold ability and versatility of application.

15 Claims, 17 Drawing Sheets

Related U.S. Application Data

(60) Provisional application No. 62/155,693, filed on May 1, 2015, provisional application No. 62/040,516, filed on Aug. 22, 2014, provisional application No. 62/037,942, filed on Aug. 15, 2014.

(51) Int. Cl.
  *B05B 1/04* (2006.01)
  *B05B 15/68* (2018.01)
  *B05B 1/10* (2006.01)
  *B05B 1/26* (2006.01)
  *B60S 1/46* (2006.01)

(52) U.S. Cl.
  CPC ............... *B05B 1/267* (2013.01); *B60S 1/46* (2013.01); *B60S 1/52* (2013.01)

(58) Field of Classification Search
  CPC . B60S 1/606; B05B 1/04; B05B 1/042; B05B 1/044; B05B 1/046; B05B 1/048; B05B 1/08; B05B 1/10
  See application file for complete search history.

(56) References Cited

U.S. PATENT DOCUMENTS

| | | | |
|---|---|---|---|
| 6,074,078 A | 6/2000 | Georgeff et al. | |
| 6,240,945 B1 | 6/2001 | Srinath | |
| 6,253,782 B1 | 7/2001 | Raghu | |
| 6,296,198 B1* | 10/2001 | Tores | B60S 1/481 239/284.1 |
| 7,316,362 B2 | 1/2008 | Miyauchi | |
| 7,478,764 B2 | 1/2009 | Gopalan | |
| 8,205,812 B2 | 6/2012 | Hester | |
| 8,430,108 B2 | 4/2013 | Bettenhausen | |
| 8,662,421 B2 | 3/2014 | Russell | |
| 2003/0234303 A1 | 12/2003 | Berning | |
| 2005/0087633 A1 | 4/2005 | Gopalan | |
| 2006/0043110 A1 | 3/2006 | Miyauchi | |
| 2007/0063076 A1 | 3/2007 | Gopalan | |
| 2008/0283628 A1 | 11/2008 | Beyer | |
| 2009/0188991 A1 | 7/2009 | Russell | |
| 2009/0236449 A1 | 9/2009 | Gopalan | |
| 2014/0060582 A1 | 3/2014 | Hartranft et al. | |

FOREIGN PATENT DOCUMENTS

| | | |
|---|---|---|
| WO | WO80/01884 | 9/1980 |
| WO | 2012138455 A1 | 10/2012 |

OTHER PUBLICATIONS

European Patent Office, European Search Report for EP App. No. 15831961.6 dated Mar. 18, 2018.

* cited by examiner

COMPACT SPLIT-LIP SHEAR WASHER NOZZLE

CROSS REFERENCE TO RELATED APPLICATIONS

This application is a continuation of International Application No. PCT/US2015/045429, filed on Aug. 15, 2015, which claims the benefit of U.S. Provisional Application No. 62/037,942, entitled "Angled Shear Washer Nozzle", filed on Aug. 15, 2014, U.S. Provisional Application No. 62/040,516, entitled "Angled Shear Washer Nozzle", filed on Aug. 22, 2015, U.S. Provisional Application No. 62/155,693, entitled "Split-lip Shear Shape Washer Nozzle", filed on May 1, 2015 the entire contents of which are hereby incorporated by reference.

FIELD OF THE INVENTION

The present invention relates to automotive washer nozzles for cleaning relatively small external surfaces such as external camera lens surfaces, and cleaning them very well with no requirement for a mechanical wiper or the like.

BACKGROUND

Fluidic type washer nozzles are well known for high efficiency (big coverage, high speed with low flow rate) spray performance. However, the major limitation of fluidic nozzle is that the nozzle assembly's package size needs to be large enough (for example, the linear distance from the fluid inlet or feed to the exit orifice or front to back thickness needs to be at least 6 mm for most of fluidic circuits).

For some applications, package size is a big concern due to very limited available space. Jet spray nozzles were commonly used in such limited space applications. Because of their excessively narrow spray pattern, jet spray nozzles typically must be supplied with very high cleaning fluid flow rates or must be operated for longer spray durations to effectively clean a glass or external lens surface. Jet spray nozzles have smaller package size than fluidic nozzles, but do not have effective spray patterns for many automotive cleaning applications such as cleaning a camera lens, where the surface must be cleaned very well, and without requiring a mechanical wiper or the like.

Some shear nozzles can be made to generate useful sprays for washing and can be made adjustable with ball-shaped inserts which are configured to move within a socket in a nozzle housing, but size constraints have remained a problem. Automotive designers want very compact nozzle assemblies for automotive washer nozzles, but also want an even spray distribution. Automotive OEMs also want a nozzle which is very economical and versatile. For example, exterior trim assemblies often combine many functions, such as the Center High Mounted Stop Light ("CHIMSL") light assemblies now required by US DOT regulations. Center High Mounted Stop Light ("CHIMSL") assemblies can include other features such as external cameras, but cleaning the lenses on those cameras becomes problematic, if the automotive stylist's design for exterior trim is to be preserved.

There are many examples of automotive exterior trim assemblies with awkwardly incorporated spray nozzles which may preserve the aesthetic appearance of the automotive trim but do not generate a spray which will adequately cleans a window or other surface. An early example is provided in U.S. Pat. No. 6,074,078 which has a vehicle 14 with an exterior panel or surface 12 including Center High Mounted Stop Light ("CHIMSL") trim assembly 10 having a fluid supply line 18, and a lens 24 with a spray tip 70 configured to spray jets of washing fluid through apertures 72 from beneath nozzle hood 44 (as reproduced in Prior Art FIGS. 1A-1D). This nozzle configuration will reliably pour jets of washing fluid downwardly, generally onto the rear window or backlight glass of the vehicle, but little more can be said for the spray's ability to clean any particular surface. Nozzle configurations like that shown in FIGS. 1A-1D work well enough to clean a rear window if the wiper blade is also used, but the spray from this nozzle, alone, does little to clean the window.

Cleaning something as small and specialized as a vehicle's external view camera lens surface is much more demanding, from a technical perspective (as set forth in applicant's commonly owned patent application publications including WO/2012/138455), but automotive OEM designers seek ever smaller and more visually inconspicuous solutions for external lens cleaning sprays. Nozzles for generating these sprays would be most desirable if they were readily configured for incorporation into an aesthetically pleasing and easily installed exterior trim assembly incorporating a plurality of diverse components such as a Center High Mounted Stop Light ("CHIMSL"), one or more external view cameras, and one or more nozzle assemblies as would be required to clean the external surfaces of those cameras (or adjacent windows).

There is a need, therefore, for a practical, economical very compact yet effective automotive washer nozzle configuration and cleaning method which can be implemented in smaller and more visually inconspicuous package for incorporation into an aesthetically pleasing and easily installed exterior trim assembly incorporating a plurality of possibly diverse components such as a Center High Mounted Stop Light ("CHIMSL"), one or more external view cameras, and the nozzle assemblies required to clean the external surfaces of the cameras or adjacent windows.

SUMMARY

Accordingly, it is an object of the present invention to overcome the above mentioned difficulties by providing a new way to integrate a nozzle assembly which can reliably generate the desired sprays with spray aiming and orientation features by aiming one or more open orifices from a very compact (e.g., 5 mm dia.) spray head.

In accordance with the present invention, a new and surprisingly small (e.g., 5 mm dia.) compact shear spray nozzle member with a selectable spray orientation is configured very economically in a unitary or one-piece molded part. This compact nozzle member or spray head is preferably configured with first and second shear nozzle orifices which are oriented and aimed to generate sprays having selected fan angles. The spray fan angle may be selected from within the range of 30° to 120°. Spray orientation angles (aim, roll and yaw) may be selected from within the range of 0° to 45°. The nozzle assembly of the present invention makes available configurations with greatly reduced package size and cost, without sacrificing spray coverage.

A split-lip shear nozzle embodiment of the present invention encompasses a very compact spray head design for an automotive washer nozzle. The spray fan is dual shear shaped, producing an even distribution, which may be selectively varied from 30° to 120°. The visually inconspicuous split lip shear spray head is a distally projecting almost hemispherical bump which may be as small as 5 mm in diameter and yet provides a range of available spray aim, yaw and roll angles. The split-lip shear nozzle embodiment is preferably a one-piece plastic molded component with laterally spaced spray orifices separated by a splitter and the spray head is configured in a manner which provides improved mold-ability and versatility of application.

In an alternative embodiment configured particularly for a rear Center High Mount Stop Light ("CHMSL") mounted nozzle assembly, manufacturing advantages are provided and manufacturing (process) failure modes that currently exist with the prior art rear shear nozzles are eliminated. The CHMSL nozzle assembly design of the present invention eliminates a problematic "shut off" failure mode which typically complicates the exit port in the prior art nozzle, due to molding problems. The CHMSL split-lip shear nozzle assembly of the present invention has small port which is traditionally subject to flashing issues (giving rise to the failure mode wherein flashing on the molded part partially or completely shuts off the spray), severely degrading or stopping the spray. In one embodiment, the nozzle assembly is configured for use with an "insert" with the possibility for different nozzle geometries being defined in the fluid channels within the "insert".

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DETAILED DESCRIPTION

Figure 1A:
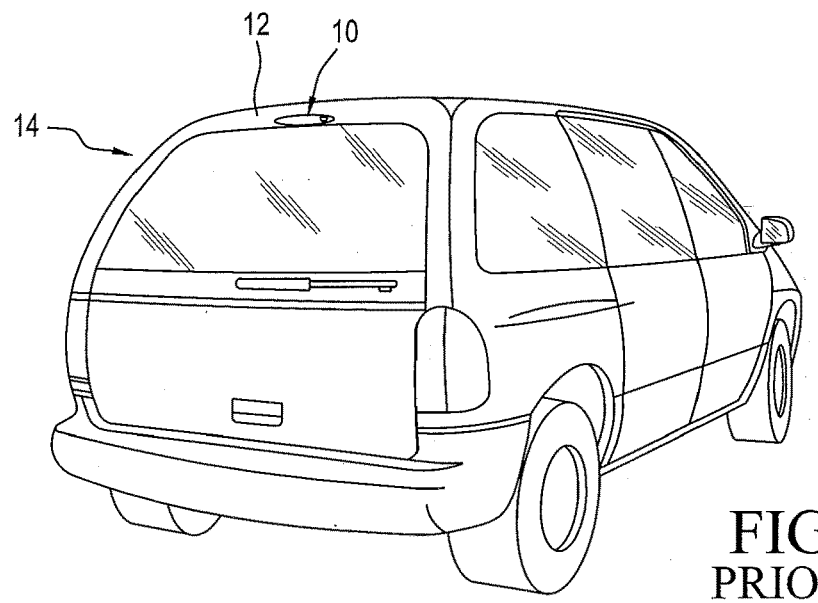
FIGS. 1A-1D illustrate a vehicle with traditional Center High Mount Stop Light ("CHMSL") trim assembly including a nozzle configured to pour jets of cleaning fluid onto a vehicle's rear window or back light, in accordance with the Prior Art.
Figure 1B:
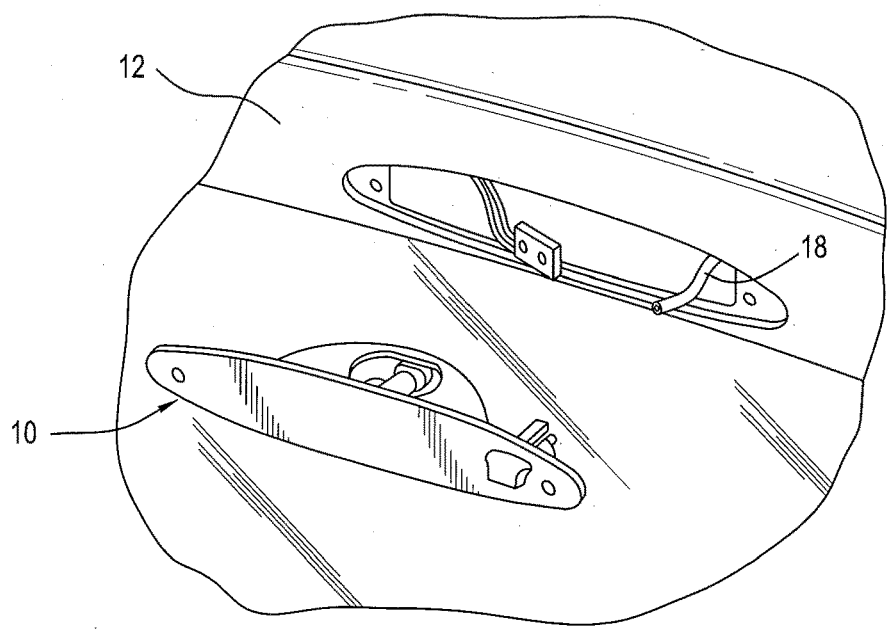
Figure 1C:
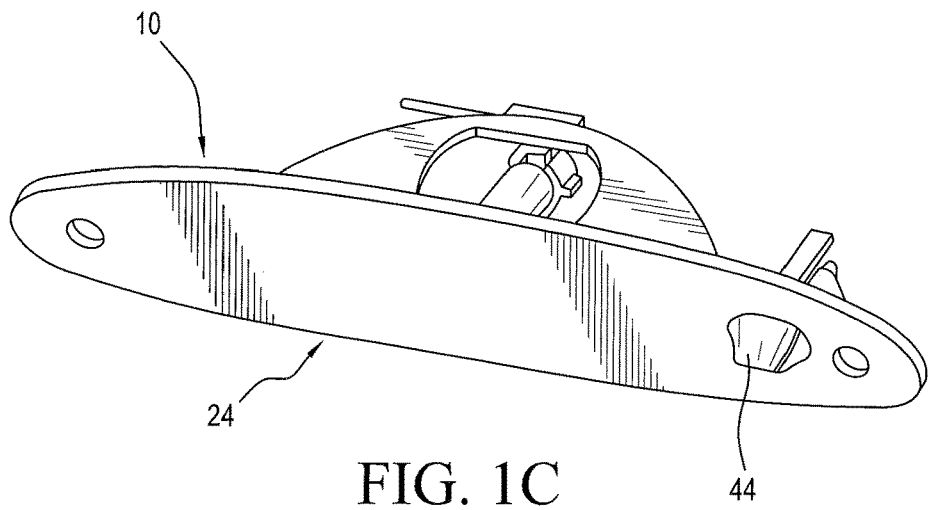
Figure 1D:
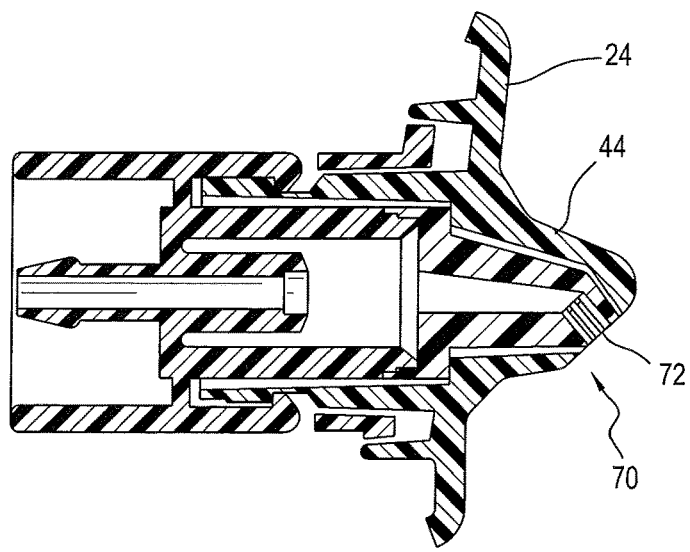

Turning now to a detailed description of the automotive trim mounted spray nozzle assembly and compact shear spray nozzle member of the present invention, FIGS. 2-11 illustrate specific, illustrative embodiments for the shear spray nozzle configurations and the methods for selecting and aiming the nozzles to provide desired sprays. All of the illustrated embodiments provide a very compact spray head design which reliably generates a spray fan or pattern which is made up of two or three shear-shaped planar sprays that evenly distribute cleaning fluid (e.g., water) over a combined spray fan angle of selected angular spread (e.g., 30° to 120°). All of the automotive trim mounted spray nozzle assemblies and compact shear spray nozzle members of the present invention (e.g. 100, 200, 300) are well suited for integration into an automotive exterior trim piece such as Center High Mounted Stop Light ("CHIMSL") assembly 10 for use on a vehicle 14, as illustrated in FIG. 1A. The nozzle assemblies and nozzle members described below (e.g. 100, 200, 300) could also easily be incorporated very inconspicuously into a vehicles exterior panel 12 or external component (e.g., a side mirror assembly) along with an external view camera (not shown) to provide a very compact camera wash nozzle.

Figure 2:
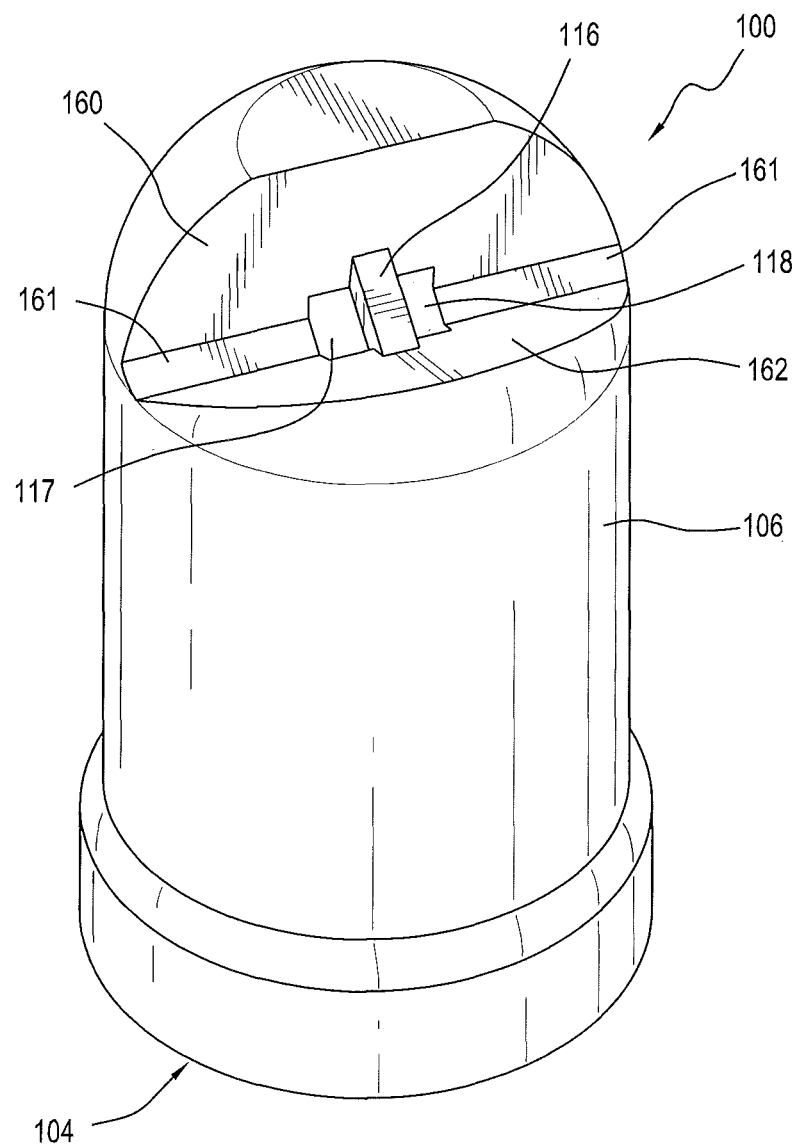
FIG. 2 is a perspective view, in elevation, illustrating a one-piece plastic molded compact split-lip shear nozzle member, configured with laterally spaced spray orifices separated by a splitter to aim a planar fan-shaped spray onto a surface to be cleaned, where the spray has a selected fan width, a selected yaw angle and a selected roll angle, in accordance with the present invention.
Figure 3:
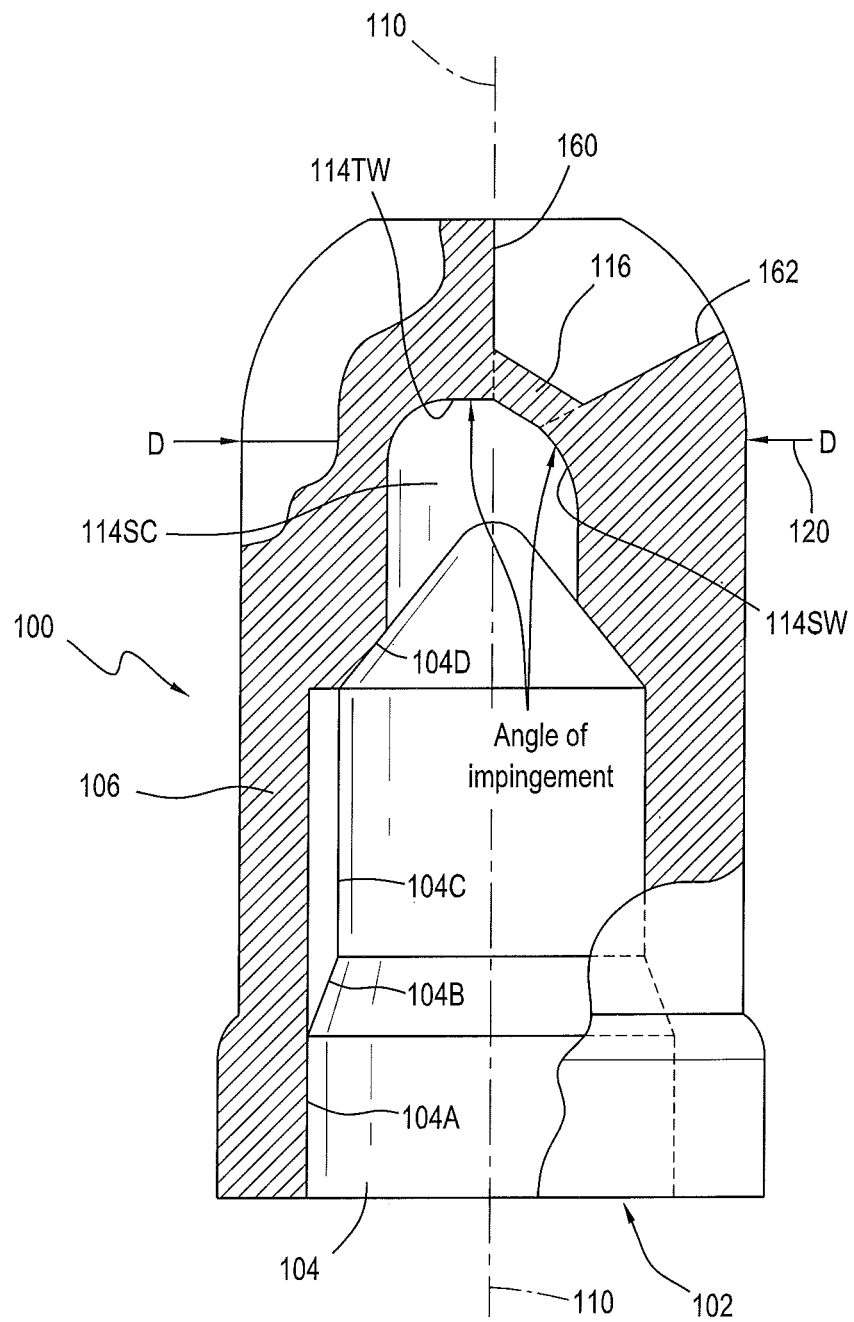
FIG. 3 is a left side view, in elevation and partial cross section, illustrating the external surfaces and internal lumen surfaces of the compact split-lip shear nozzle member of FIG. 2, in accordance with the present invention.
Figure 4:
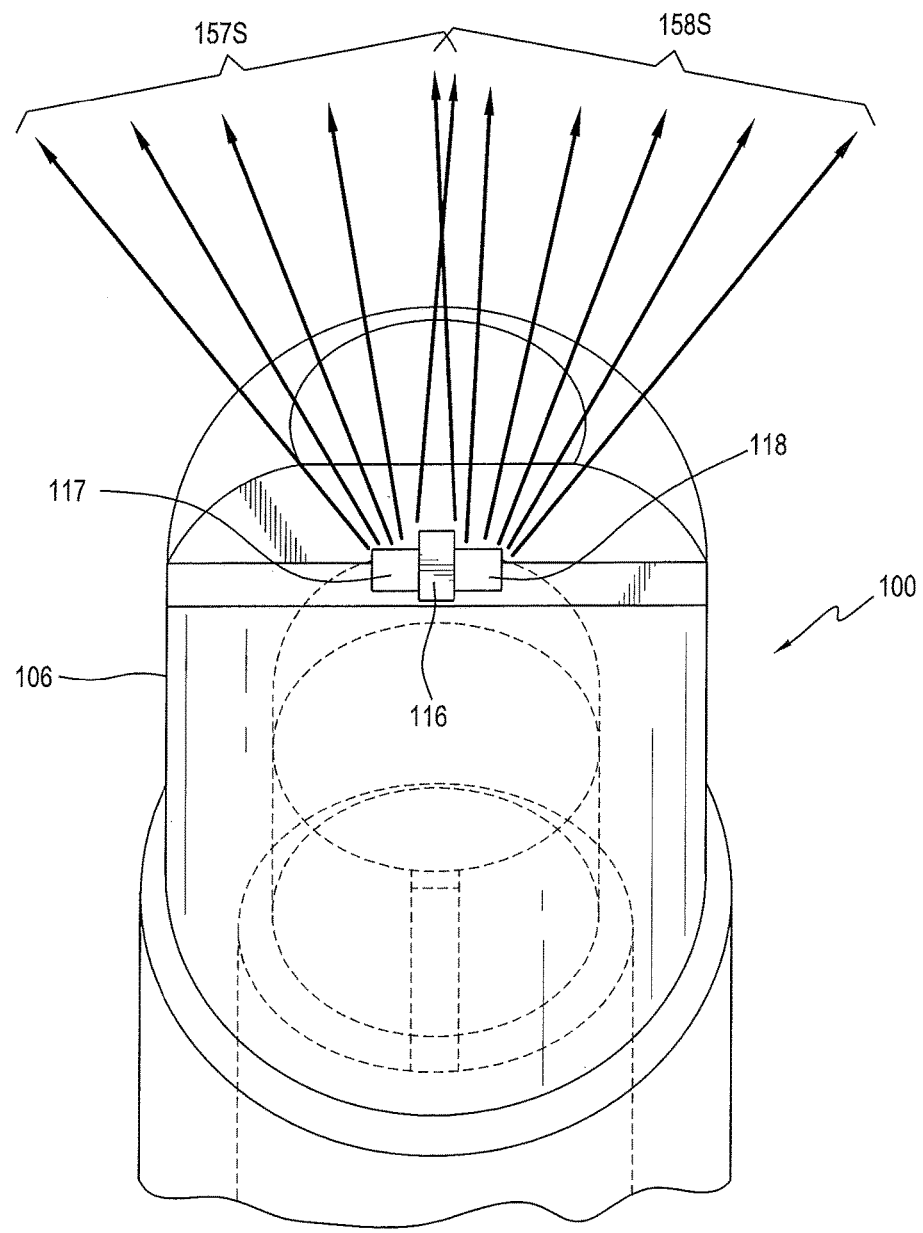
FIG. 4 is a distal end view, in elevation and partial cross section, illustrating the external surfaces surrounding the laterally spaced spray orifices separated by a splitter and the internal lumen surfaces of the compact split-lip shear nozzle member of FIGS. 2 and 3, illustrating the dual shear-shaped spray fan, in accordance with the present invention.
Figure 5A:
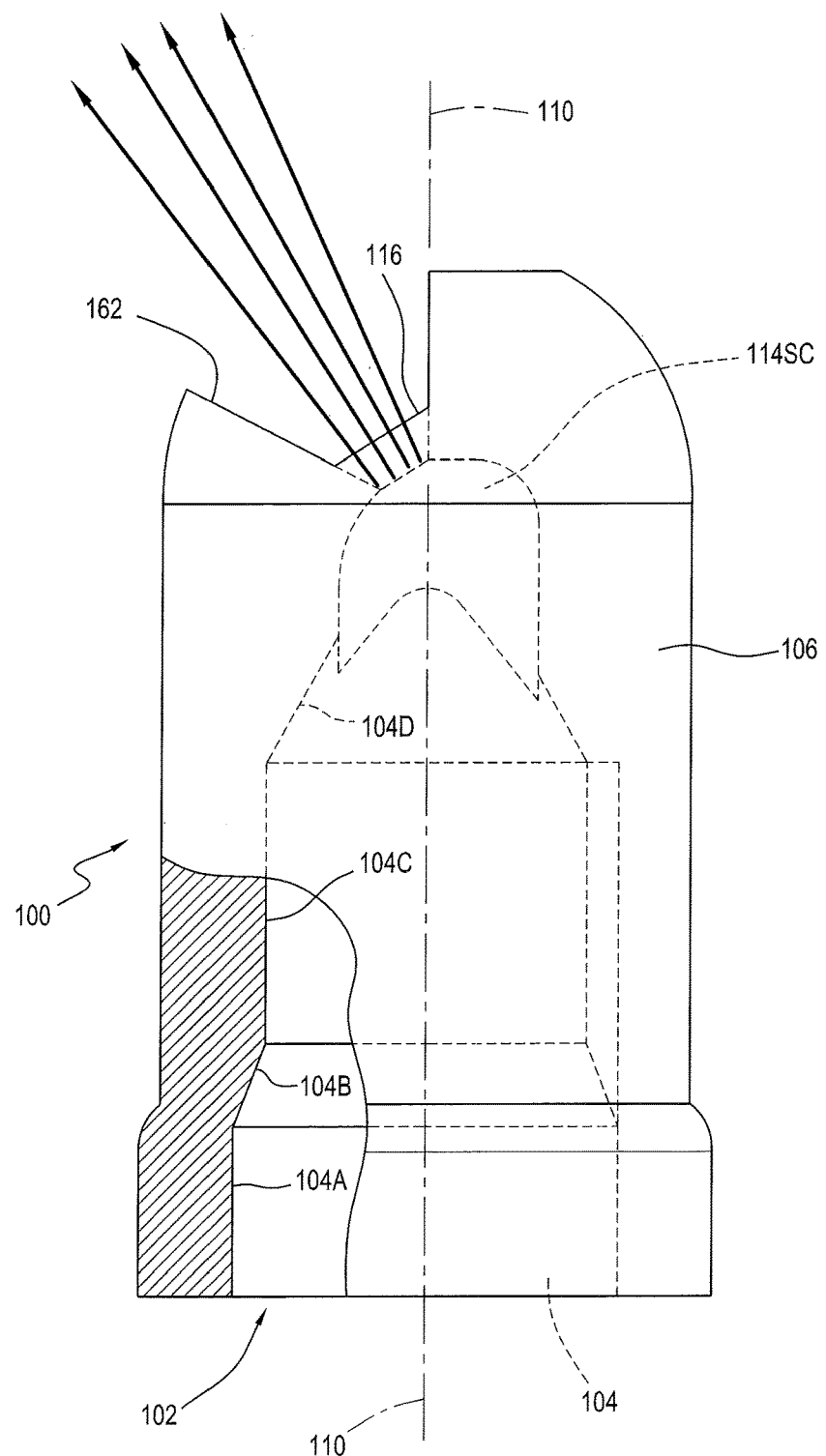
FIG. 5A is a right side view, in elevation and partial cross section, illustrating the external surfaces and internal lumen surfaces of the compact split-lip shear nozzle member of FIGS. 2-4, in accordance with the present invention.
Figure 5B:
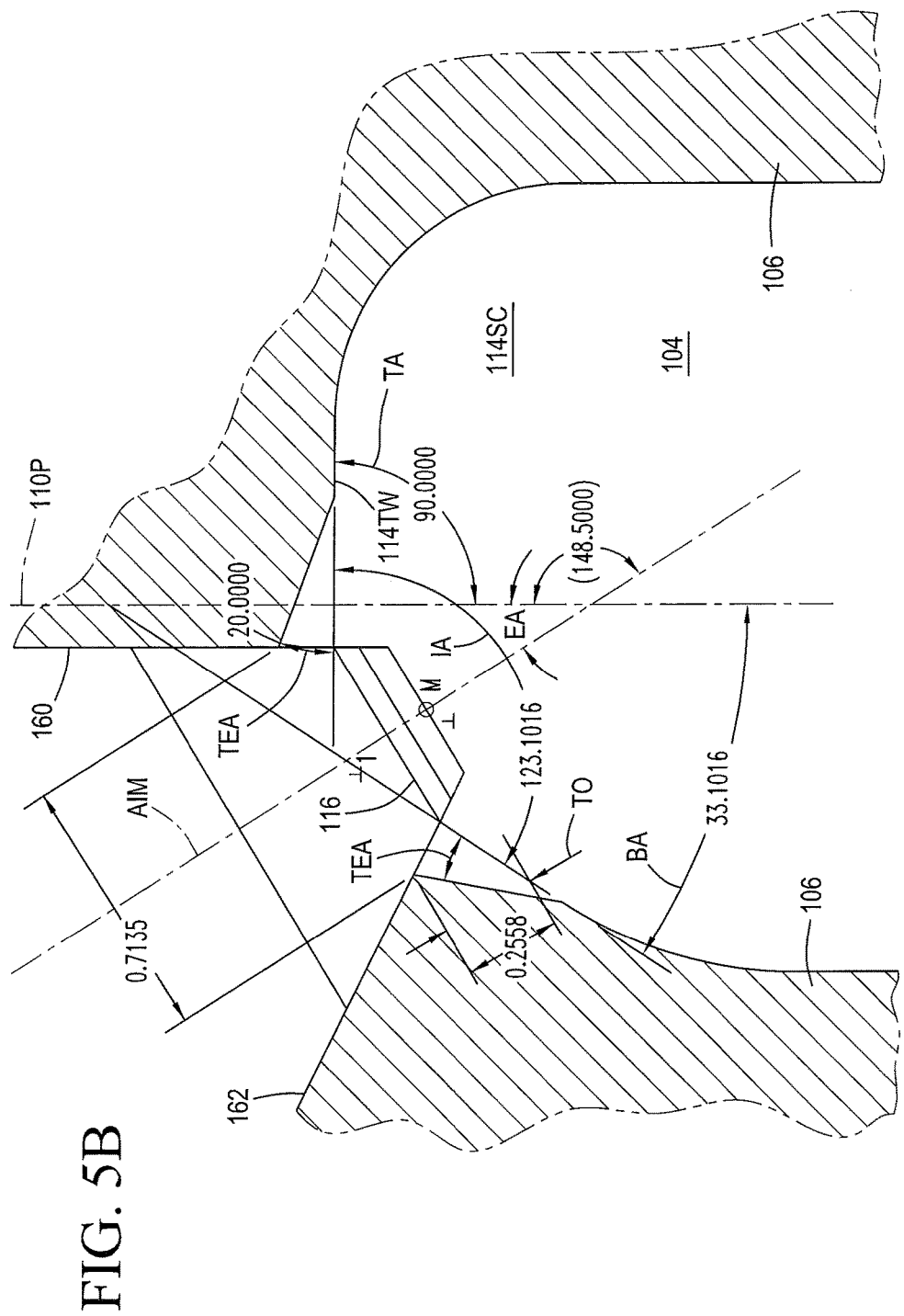
FIG. 5B is a right side cross section in detail, illustrating the spray orifice defining wall configuration, the placement and configuration of the splitter and the internal lumen surfaces defining the fluid impingement surfaces at the distal end of the compact split-lip shear nozzle member of FIGS. 2-4, in accordance with the present invention.
Figure 5C:
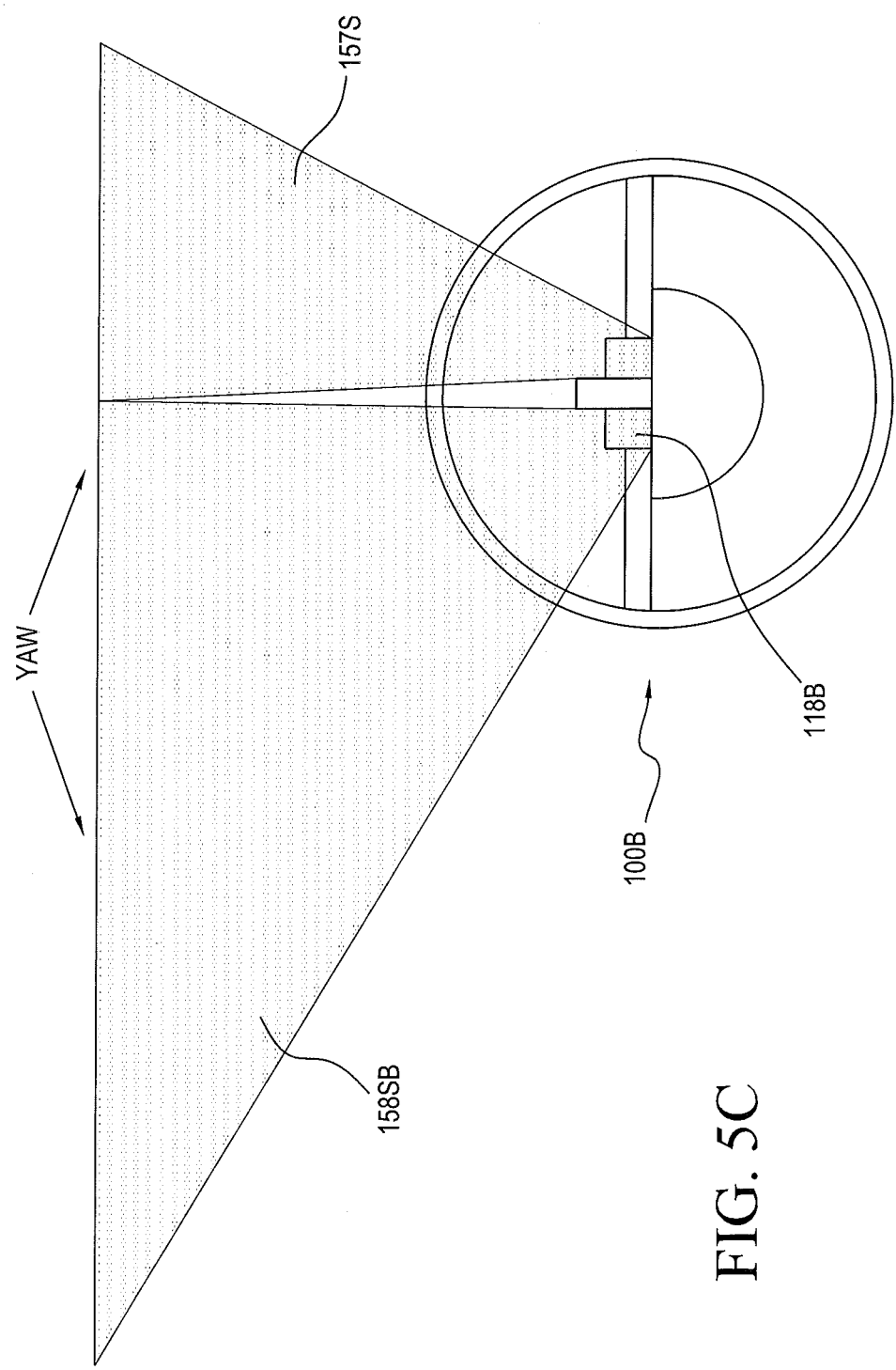
FIG. 5C is a distal end view, in elevation, illustrating an alternative embodiment of the one-piece plastic molded compact split-lip shear nozzle member, configured with laterally spaced spray orifices separated by a splitter to aim another planar fan-shaped spray onto a surface to be cleaned, where the spray has an asymmetrical selected yaw angle, in accordance with the present invention.
Figure 5D:
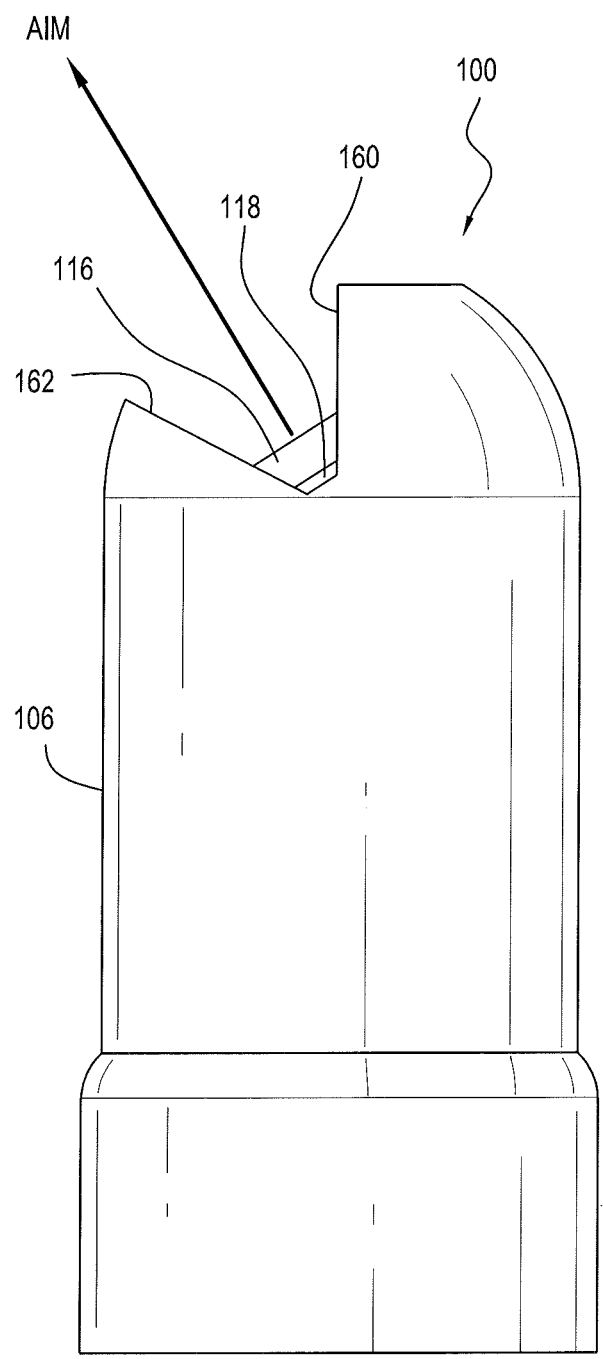
FIG. 5D is a right side view, in elevation and partial cross section, illustrating the compact split-lip shear nozzle member of FIGS. 2-4, where the spray is directed into a selected aim angle, in accordance with the present invention.

Beginning with the spray head embodiment illustrated in FIGS. 2-5D, compact shear spray nozzle member or spray head 100 could be as small as 5 mm in diameter (120, D-D as shown in FIG. 3), and the design of spray head 100 can be configured to provide various spray aim, yaw and roll angles (see FIGS. 5C and 5D). The illustrated embodiment of spray head 100 is readily molded from suitable plastic materials and is configured for better mold-ability and versatility of application.

Spray head 100 is preferably molded in a one-piece unitary structure from fluid impermeable durable plastic material into a substantially cylindrical hollow member having a substantially open proximal end 102 defining a substantially circular open lumen 104 enclosed within and coaxially aligned with the central axis of a distally a projecting nearly cylindrical (slightly tapered, frustoconical) sidewall 106. The central flow axis 110 of spray head 100 extends distally and the diameter 120 of spray head 100 (e.g., 5 mm) is measured from side to opposing side across central spray axis 110, as best seen in FIG. 3.

Spray head lumen 104 is configured to accelerate fluid passing distally through lumen 104 and has a first proximal cylindrical segment 104A which terminates distally into a proximal narrowing tapered sidewall segment 104B which narrows or tapers distally to a smaller inside diameter at central cylindrical segment 104C. Central cylindrical segment 104C terminates distally into a distal narrowing tapered sidewall segment 104B, which terminates distally in a somewhat dome-shaped fluid impingement shear generating chamber 114SC, as shown in FIGS. 3, 5A and 5B. The configuration of the interior surfaces of dome-shaped shear generating chamber 114SC is shown in detail in the cross sectional view of FIG. 5B, where the distal end of the lumen or channel 104 is seen to provide concave fluid impingement surfaces. Pressurized fluid flowing from a reservoir is pumped into lumen 104 where it is accelerated as it flows distally toward shear generating chamber 114SC where a high velocity spray is forced into a selected spray pattern by first and second laterally spaced spray orifices 117, 118 which are defined, in part by a substantially planar wall segment or splitter 116.

The fluid flows into the nozzle inlet 102 and into lumen 104, where it is forced to flow distally along the narrowing fluid flow channel defined by lumen 104 and be emitted as a spray of fluid droplets from the split or first and second outlets 117, 118. As fluid flows along the fluid flow channel from the channel's inlet 102 which receives fluid from and is in fluid communication with a fluid supply or reservoir, the fluid is accelerated in the tapered transition regions 104B, 104D which reduce the cross sectional area of fluid flow channel 104. The shear spray generating chamber 114SC is in fluid communication with and receives fluid from the lumen or fluid flow channel 104 and that fluid flows around the fluid-impermeable substantially planar wall segment or splitter 116 and around the opposing channel sidewalls to create a first substantially planar spray 157S from first shear outlet 117 and a second substantially co-planar spray 158S from second spray outlet 118, and the combined sprays from outlets 117 and 118 have at least a small overlap (see FIG. 4) and so together generate a relatively evenly distributed spray with a selected fan angle in the range of 30 degrees to 120 degrees. The co-planar sprays 157S and 158S are projected distally in fans which are inclined at an aim angle, as best seen in FIG. 5D, and the spray shape and aim angle are determined, in part by the configuration of the nozzle outlet orifice defining notch wall segments 160, 161, 162, as best seen in FIGS. 2, 3, 5B and 5D. Notch wall segment 160 is substantially planar, is aligned vertically or with central axis 110 (as best seen in FIG. 3) and terminates proximally in angled notch wall segment 161, which defines the outer edges of outlets 117 and 118. The lower notch wall segment 162 also terminates proximally in angled notch wall segment 161, as best seen in FIG. 2.

For the embodiment illustrated in FIG. 5B, the central spray axis for outlets 117 and 118 is centered between the planes of notch walls 160 and 162 and defines an "exit angle" which corresponds to the spray's aim "AIM" angle illustrated in FIGS. 5B and 5D. In the exemplary embodiment shown in FIG. 5B, the exit angle EA is 31.5 degrees from a vertical plane 110P which is parallel to central axis 110, but exit angle EA could be larger (for a more horizontal AIM angle) or smaller (so the AIM angle is closer to parallel with plane 110P). Inside shear chamber 114SC, the distal end wall or top wall 114TW defines a Top approach "TA" angle which is 90 degrees from vertical, and the chamber's sidewall 114SW defines a Bottom approach "BA" angle which is 33.1 degrees from vertical, meaning that the included angle between these shear chamber wall segments is about 123 degrees from each other and this defines the Impingement angle ("IA") proximate the spray throats or outlet orifices 117, 118. In the embodiment illustrated in FIGS. 2-5D, the Throat exit opening span is 0.5 mm to 1 mm (preferably 0.7135 mm) from the edge of notch wall 162 to the edge of vertical notch wall 160 and the Throat exit span from each exit's side (at the corresponding edge of notch wall 161 to the splitter 116) is 0.25 mm to 0.75 mm (preferably 0.5 mm). The Throat exit offset "TO" from the back flat (defined by notch wall 161 and the edges of the throat exits 117, 118) is preferably 0.15 mm to 0.35 mm (preferably 0.2558 mm), and the Throat exit angles "TEA" (for angled wall segments within the chamber 114SC proximate the throat exit edges) are 0 degrees to 35 degrees (preferably 20 degrees) from either side (70 degrees from vertical at notch wall 160 and 13.1 degrees from vertical at notch wall 162).

It will be appreciated by persons having skill in the art that molded compact shear spray nozzle member 100 provides a molded compact one-piece spray head having an open proximal end 102 in fluid communication with an interior lumen 104 with tapering transition regions having progressively smaller internal lumen cross sectional areas to accelerate washing fluid toward shear-spray generating chamber 114SC with its elongated spray orifice having a first orifice edge at notch wall 160 opposing a second orifice edge at notch wall 162. Distal shear-spray generating chamber 114SC also having a first (distal end) concave wall segment defining a first fluid impingement angle, where that first concave wall segment terminates in the first spray orifice edge at notch wall 160. The distal shear-spray generating chamber 114SC also has a second concave wall segment defining a second fluid impingement angle (as seen in FIG. 3), where the second concave wall segment terminates in the second spray orifice edge at notch wall 162. The exterior of compact shear spray nozzle member 110 terminates in a distal substantially hemispherical or bump-shaped exterior surface (possibly including a flatted end wall) and the spray orifice generates the outwardly projecting fluid spray fan from the orifice which is split to define throat exits 117 and 118.

When in use for cleaning camera lenses, automotive glass surfaces or the like, washing fluid is fed into and distributed across the full feed via the conical area upstream or prior to the shear chamber 114SC, as the feed is not directly centered in the cap or dome shaped chamber's distal end. The throat geometry is set up after the multi-lip shear nozzle in that there are varying throat exit angles. The nozzle utilizes a branched center portion of the throat, as can be seen in FIGS. 3 and 4, in order to eliminate the heavy center of the spray. This effectively creates two smaller more uniform spray fans 157S, 158S at some equal angle from center. The angle of these fans is determined by the angle created by the splitter 116 and the sidewall. The angle of each individual fan may be controlled by the angle of impingement and offset distance from the throat.

As illustrated with an alternative embodiment compact shear spray nozzle member 100B illustrated in FIG. 5C, the spray's Yaw may be selected to be asymmetrical by opening one side (e.g., 118B) more than the other. A relatively wide spray angle for spray 158SB may be achieved with this design, which produces a like uniform spray, which does not foam, with a slightly heavier band where the two fans 157S, 158SB meet.

In accordance with the present invention, a new way to make a 5 mm diameter shear shape spray nozzle 100 with variable spray orientation in one-piece molded part is provided. The spray fan angle may be varied from 30° to 120° and the generated spray exhibits a uniform, non-foaming fan. The nozzle is configurable so that spray orientation angles (aim, roll and yaw) may be varied from 0° to 45°. The package size and cost are therefore greatly reduced without sacrificing spray coverage. Furthermore, the design of this nozzle allows for rotation of the cap about central axis 110 based on a clocking feature, allowing the nozzle configuration of the present invention to be easily adapted for use in other automotive lens or window surface washing applications.

As shown in FIGS. 2-5D, fluid is fed to a substantially elongated orifice defined behind splitter wall segment 116, and that orifice is at least partially blocked by splitter 116. The shear chamber defines substantially hemispherical shaped surface which guides and distributes the distal fluid flow to expand at the elongated or elliptical orifice which is divided by splitter wall segment 116 to define throat exits or spray orifices 117, 118 and that expanding flow forms a split sheet-shaped spray fan, where the placement of the splitter defines two throat exits or orifices. The spray orientation (aim, roll and yaw angles) is determined by the spray exit guide surfaces which are substantially normal to the inrushing fluid's angle of impingement (as indicated in FIG. 3). The first and second spray fans are formed as shown in FIGS. 4 and 5A). The spray fan angle is determined and controlled by adjusting height and width of elliptical orifice is divided by splitter wall segment 116 to define throat exits or spray orifices 117, 118. The spay distribution may be uniform and light ended.

As noted above, the compact shear spray nozzle member 100 of FIGS. 2-5D may be incorporated into and aimed from a surface of a CHMSL trim assembly (e.g., 10) to provide an unobtrusive but very effective way to clean an external lens surface.

Turning now to FIGS. 6A-8, a nozzle assembly 200 is configured for a rear Center High Mount Stop Light (CHMSL) mount bezel mount (e.g., 10 but illustrates a configuration that could be incorporated into any body trim assembly bezel or vehicular body panel 12). Compact shear spray bezel mountable nozzle assembly 200 provides manufacturing advantages and eliminates manufacturing (process) failure modes that currently exist with the prior art rear shear nozzles. The design illustrated in FIGS. 6A-8 eliminates an often observed adverse spray characteristic known as "shut off" wherein sprue or flash remaining after a molding step corrupts flow at an exit port or spray orifice in prior art nozzles. This small port is subject to flashing issues which can partially or completely shut off spray, severely degrading or stopping the spray. Compact shear spray CHMSL bezel mountable nozzle assembly 200 is configured for use with an "insert" 210 which is selected from several possible nozzle inserts. Exemplary insert 210 creates a spray having a selected fan width, yaw angle and roll angle. Alternative inserts may be used in nozzle assembly 200 which can reliably create different sprays. An alternative insert 1210 is illustrated in FIG. 6B, as discussed below.

Figure 6A:
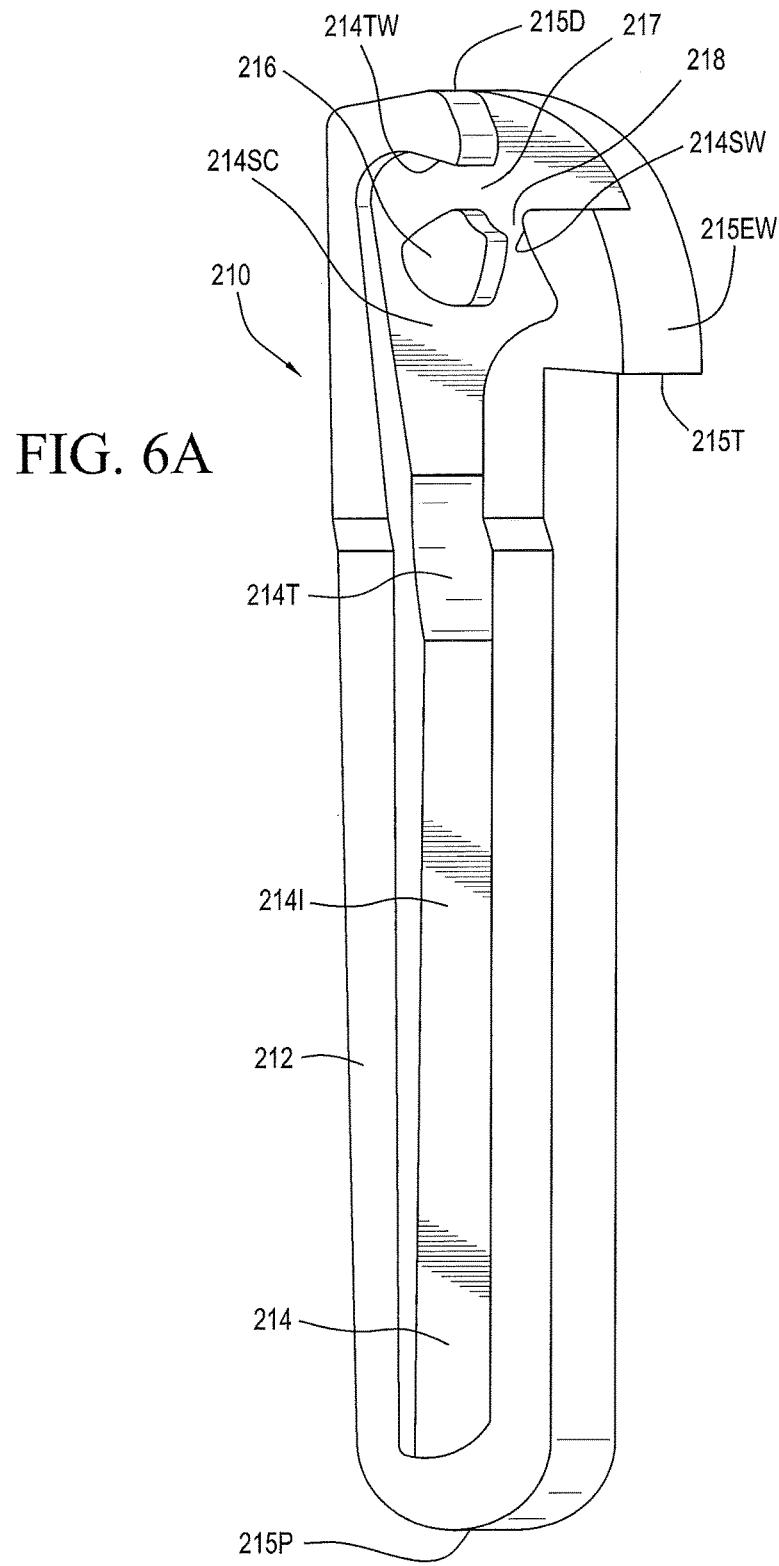
FIG. 6A is a perspective view, in elevation, illustrating the surfaces defining the fluid channel and fluid shear generating geometry and split-lip orifices for a first compact CHMSL nozzle member insert or chip, in accordance with a another embodiment of the structure and method of the present invention.
Figure 7:
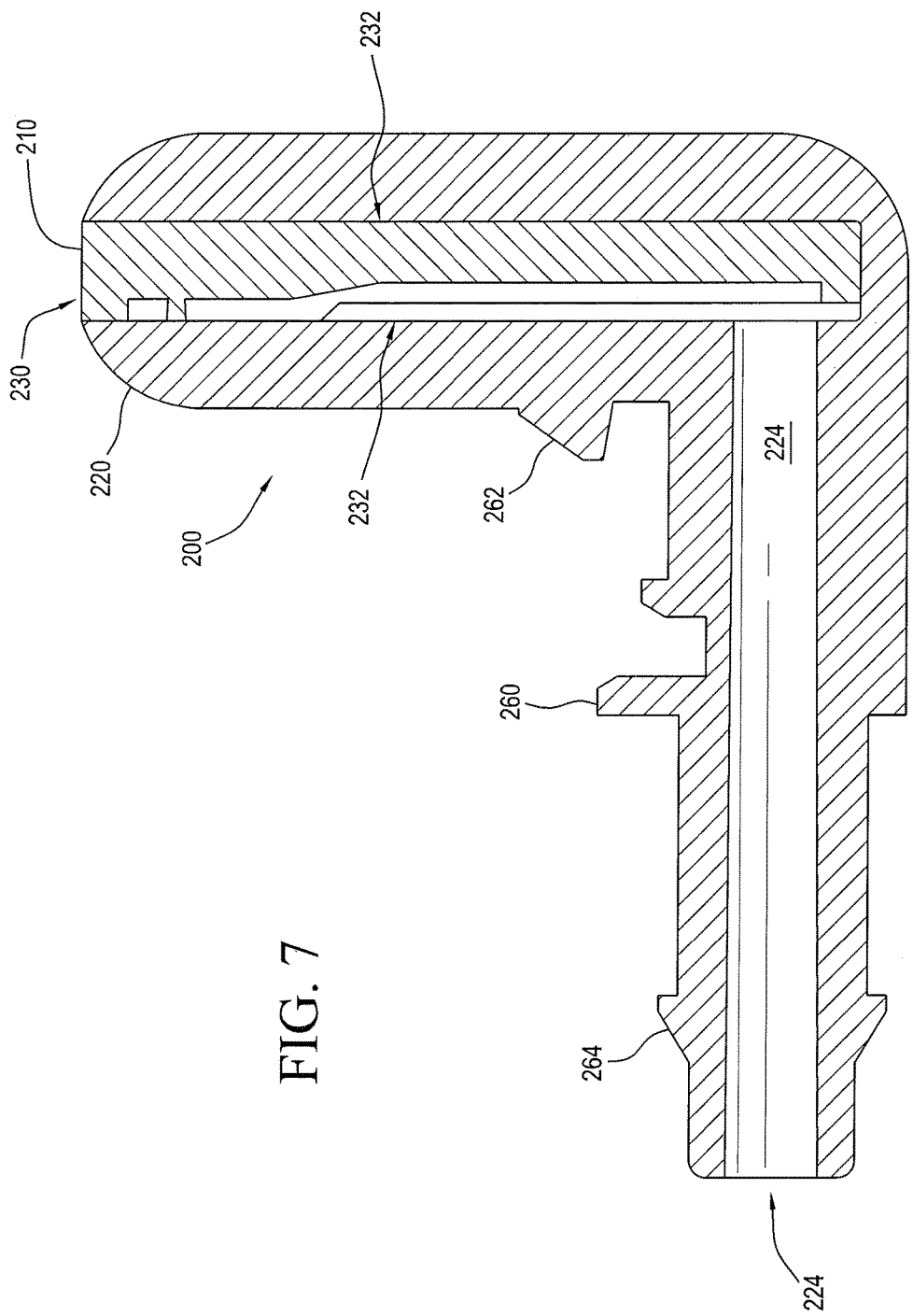
FIG. 7 is a cross sectional view, in elevation, illustrating a nozzle assembly housing and the insert or chip of FIG. 6A, showing the cooperating surfaces defining the fluid channel and fluid shear generating geometry and split-lip orifices for the compact CHMSL nozzle assembly of the present invention.
Figure 8:
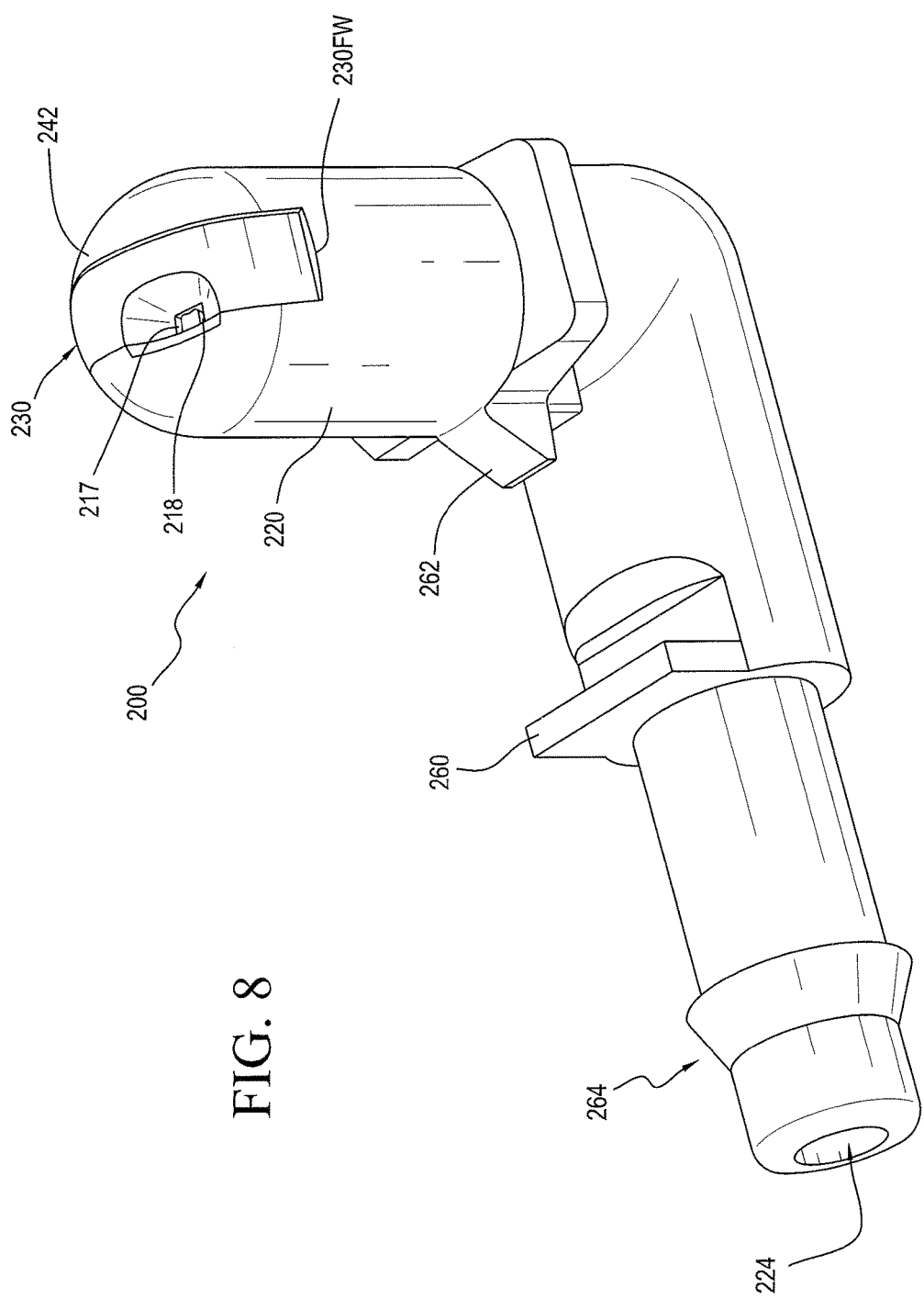
FIG. 8 is a perspective view, in elevation, illustrating the compact CHMSL nozzle assembly housing and the insert or chip of FIGS. 6A and 7 as configured for incorporation in or installation with an external trim member, in accordance with the method of present invention.

Referring particularly to FIGS. 6A and 7, new nozzle assembly embodiment 200 is configured with a new dual orifice shear outlet insert 210. Fluid spray aiming shear outlet insert 210 is configured for use in a nozzle assembly housing 220 (e.g., as shown in FIGS. 7 and 8) which defines a channel, port or slot 230 that receives and provides boundaries for the fluid paths defined in the shear outlet insert 210. Nozzle assembly 200 is configured with housing 220 which defines a substantially hollow fluid-impermeable structure with an interior lumen 224 and one or more ports or slots 230, each defining a substantially rectangular passage or aperture with smooth interior slot wall surfaces 232. The interior sidewall surfaces 232 are preferably dimensioned for cost effective fabrication using molding methods and optionally include sidewall grooves positioned and dimensioned to form a "snap fit" with ridges or tabs in a mating shear outlet insert (not shown). Nozzle assembly 200 can be configured to include one or more shear outlet inserts or chips which are dimensioned to be tightly received in and held by the slot 230 defined within the housing 220. When shear outlet insert 210 is fitted tightly within port or slot 230, the nozzle assembly provides a channel for fluid communication between the housing's interior lumen 224 and the exterior of the housing so that fluid entering the housing's interior lumen may be used to generate an flat fan-shaped spray directed distally and aimed by the orientation and configuration of the housing 220 which supports and orients or aims shear outlet insert 210.

Nozzle assembly housing 220 is illustrated in a configuration which can be assembled into an automotive trim bezel or other body mount and has a distally projecting spray aiming end 242 configured as a visually unobtrusive hemispherical bump defined around the insert receiving slot 230. The housing's distally projecting end aims the spray by defining the orientation of the slot 230 and insert 210 and so for an insert configured to generate a flat spray with a selected fan angle, the orientation of that flat spray is adjusted by adjusting the orientation of slot 230. Preferably, housing 220 is molded from a suitably tough material such as plastic and includes one or more alignment features 260 or snap-fit retaining tabs 262 on selected exterior surfaces to enable housing 220 to be assembled into an automotive trim piece or body panel (e.g., such as bezel 10, shown in FIGS. 1A-1D). The housing's fluid inlet lumen 224 is preferably configured with a tube-retaining barb fitting 264.

The shear outlet insert 210 of the present invention as illustrated in FIGS. 6A-8 is an elongated solid member having a planar side opposite a fluid channel side 212 which has fluid channel 214 defined therein. Insert 210 has an arcuate end wall 215EW which terminates distally at distal end 215D and curves downwardly in a cylindrical section to transversely projecting insert wall segment 215T, and the spray generating outlets 217, 218 can be defined in any portion of that arcuately shaped end wall 215EW. Insert 210 has a proximal end 215P which is inserted into the open distal end of housing slot 230 fully, such that the insert's distal end 215D is flush with but exposed in the distal end of the housing, whereupon the transversely projecting insert wall segment 215T abuts a cooperating transverse flange wall segment 230FW defined in housing 220 (see FIG. 8). When pressurized cleaning fluid is pumped into nozzle assembly inlet lumen 224, shear outlet insert 210 operates on a fluid shearing mechanism resulting in generation of a spray of distally projecting droplets (not shown). Current prototypes of the shear spray circuit or insert of the present invention produce a substantially planar spray with a fan angles from 30 degrees to 120 degrees by generating first and second laterally spaced and aimed spray fans from outlet orifices 217 and 218.

The exemplary embodiment of the shear outlet insert 210 as illustrated in FIGS. 6A-8 has a plurality of sections which cooperate with one another to act upon the flowing fluid passing therethrough to generate a desired spray. The fluid flows from nozzle assembly inlet 224 and into cavity 230, where it is forced to flow along the fluid flow channel 214 defined in insert surface 212 through the sections described below and emitted as a spray of fluid droplets from the split or first and second outlets 217, 218. As fluid flows distally or downstream along fluid flow channel 214 from the channel's inlet 214I which receives fluid from and is in fluid communication with housing inlet and lumen 224, the fluid is accelerated in tapered transition region 214T which reduces the cross sectional area of fluid flow channel 214. A shear chamber 214SC is in fluid communication with and receives fluid from tapered transition region 214T and that fluid flows around a fluid-impermeable inwardly projecting island protuberance 216 and around the generally concave opposing channel sidewalls to create a first substantially planar spray from first shear outlet 217 and a second substantially co-planar spray from second spray outlet 218, and the combined sprays from outlets 217 and 218 have at least a small overlap and so together generate a relatively evenly distributed spray with a selected fan angle in the range of 30 degrees to 120 degrees.

Figure 6B:
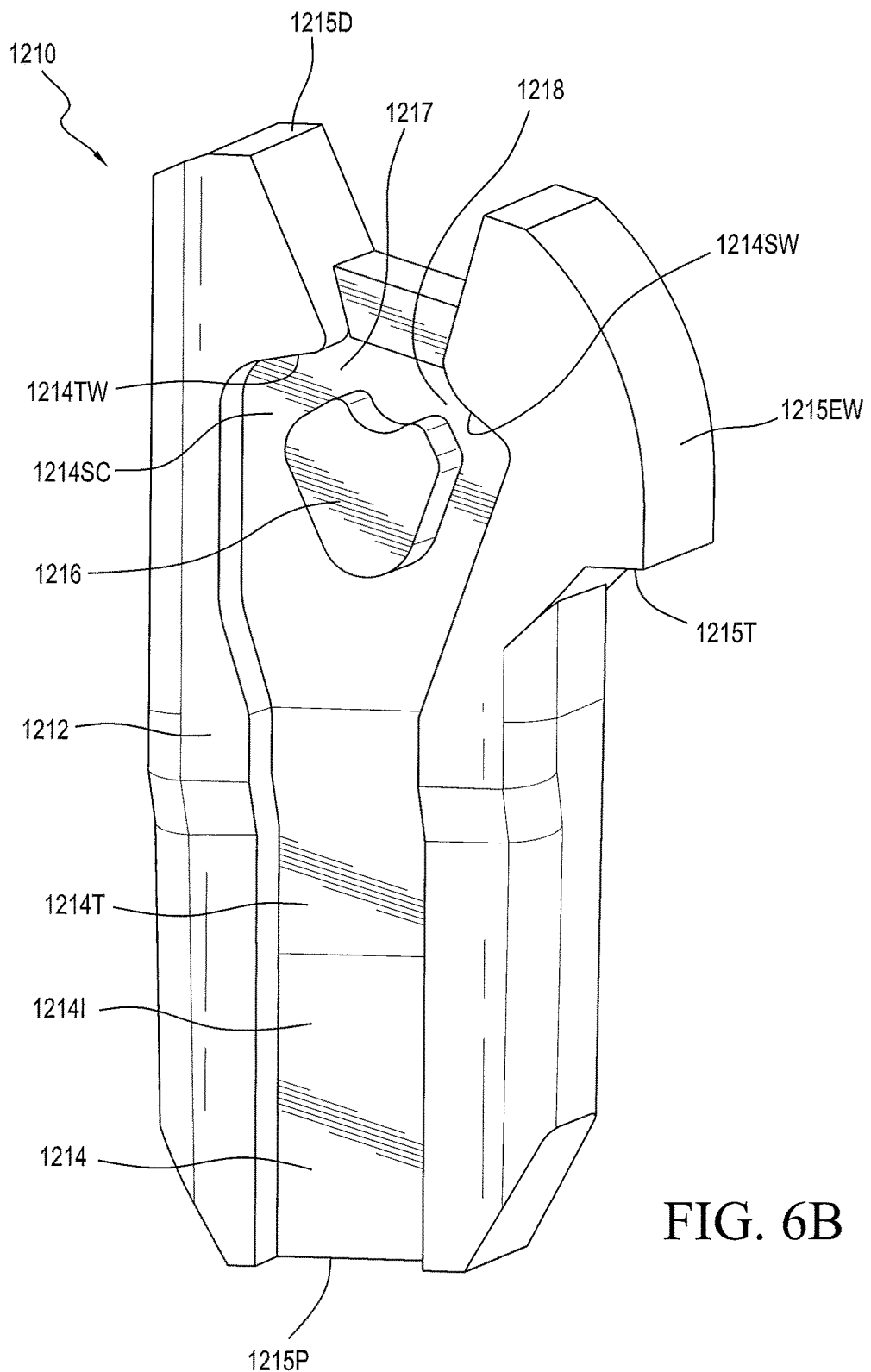
FIG. 6B is a perspective view, in elevation, illustrating a second embodiment of the compact CHMSL nozzle member insert or chip and showing the surfaces defining the fluid channel, fluid shear generating geometry and split-lip orifices, in accordance with the present invention.

An alternative embodiment of the shear outlet insert 1210 as illustrated in FIG. 6B, and it also has a plurality of sections which cooperate with one another to act upon the flowing fluid passing therethrough to generate a desired spray when inserted into nozzle assembly housing 220. The fluid flows from nozzle assembly inlet 224 and into cavity 230, where it is forced to flow along the fluid flow channel 1214 defined in insert surface 1212 through the sections described below and emitted as a spray of fluid droplets from the split or first and second outlets 1217, 1218. As fluid flows distally or downstream along fluid flow channel 1214 from the channel's inlet 1214I which receives fluid from and is in fluid communication with housing inlet and lumen 224, the fluid is accelerated in tapered transition region 1214T which reduces the cross sectional area of fluid flow channel 1214. A shear chamber 1214SC is in fluid communication with and receives fluid from tapered transition region 1214T and that fluid flows around a fluid-impermeable inwardly projecting island protuberance 1216 and around the generally concave opposing channel sidewalls 1214TW, 1214SW to create a first substantially planar spray from first shear outlet 1217 and a second substantially co-planar spray from second spray outlet 1218, and the combined sprays from outlets 1217 and 1218 have at least a small overlap and so together generate a relatively evenly distributed spray with a selected fan angle in the range of 30 degrees to 120 degrees.

As with the embodiment described above, Insert 1210 has an arcuate end wall 1215EW which terminates distally at distal end 1215D and curves downwardly in a cylindrical section to transversely projecting insert wall segment 1215T, and the spray generating outlets 1217, 1218 can be defined in any portion of that arcuately shaped end wall 1215EW. Insert 1210 has a beveled proximal end 1215P which is inserted into the open distal end of housing slot 230 fully, such that the insert's distal end 1215D is flush with but exposed in the distal end of the housing, whereupon the transversely projecting insert wall segment 1215T abuts the cooperating transverse flange wall segment 230FW defined in housing 220.

It will be appreciated by persons having skill in the art that molded compact shear spray nozzle members (e.g., 210, 1210), when used in compact shear spray nozzle assembly 200 provide a molded compact one-piece spray head having an open proximal end in fluid communication with a fluid channel or lumen 214 with tapering transition regions having progressively smaller internal lumen cross sectional areas to accelerate washing fluid toward shear-spray generating chamber 214SC with its elongated spray orifice having a first orifice edge at wall segment 215D opposing a second orifice edge at wall segment 215EW. Distal shear-spray generating chamber 214SC also has a first (distal end) concave wall segment 214TW defining a first fluid impingement angle, where that first concave wall segment 214TW terminates in the first spray orifice edge. The distal shear-spray generating chamber 214SC also has a second concave wall segment 214SW defining a second fluid impingement angle, where the second concave wall segment 214SW terminates in the second spray orifice edge. The exterior of compact shear spray nozzle member 210 terminates in a distal exterior surface 215D and the spray orifice generates the outwardly projecting fluid spray fan from the orifice which is split to define throat exits 217 and 218.

Turning now to FIGS. 9A-11, another nozzle assembly 300 is configured for a rear Center High Mount Stop Light (CHMSL) mount bezel mount (but illustrates a configuration that could be incorporated into any automotive trim piece or body panel). Compact shear spray bezel mountable nozzle assembly 300 also provides the manufacturing advantages and eliminates manufacturing (process) failure modes described above. Compact shear spray bezel mountable nozzle assembly 300 is configured for use with a distally projecting member or "insert" 310 which is selected from several possible nozzle inserts. Exemplary insert 310 creates a spray having a selected fan width, yaw angle and roll angle. Alternative inserts may be used in nozzle assembly 300 which can reliably create different sprays.

Figure 9A:
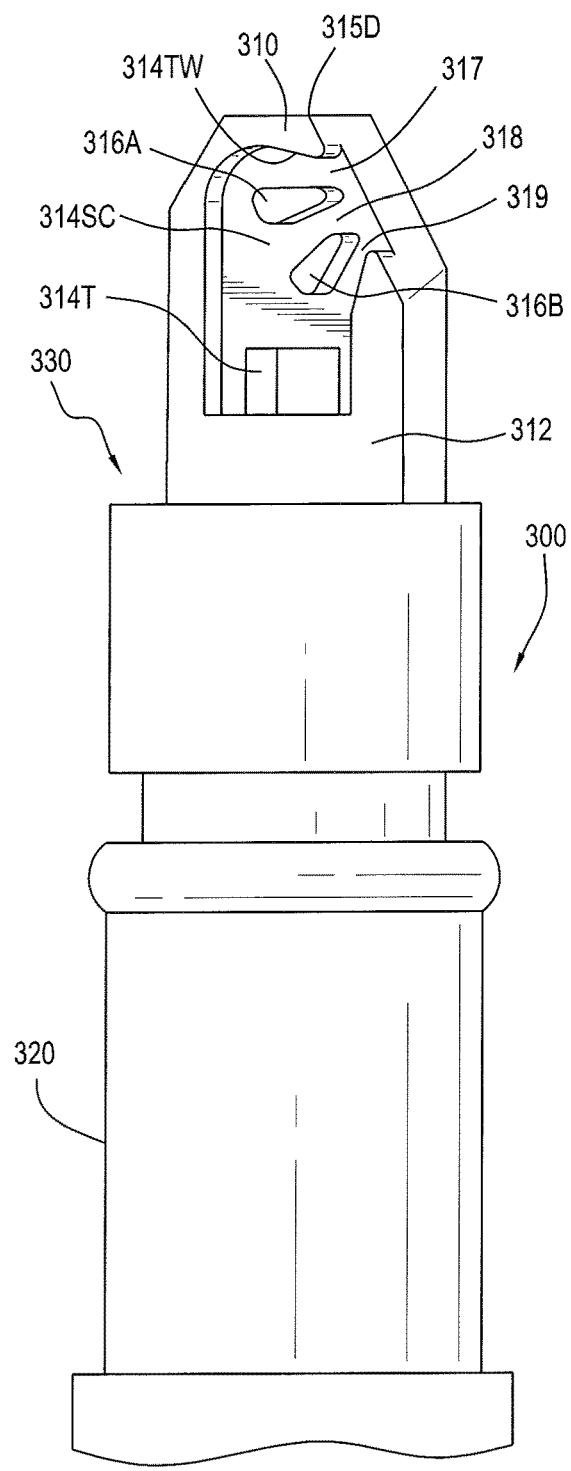
FIG. 9A is a perspective view, in elevation, illustrating another embodiment of an automotive trim mounted spray nozzle assembly and showing a compact shear spray nozzle member's fluid channel defining surfaces, in accordance with the present invention.
Figure 9B:
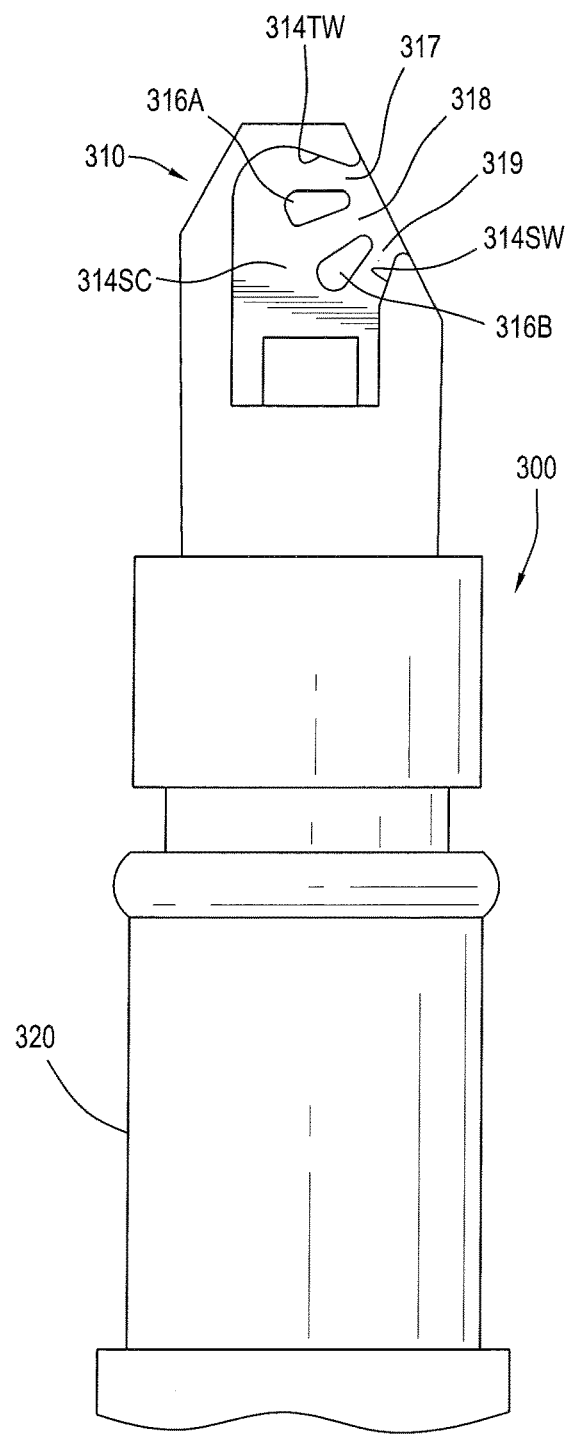
FIG. 9B is a plan view, in elevation, of the automotive trim mounted spray nozzle assembly of FIG. 9A, illustrating the compact shear spray nozzle member's fluid channel defining surfaces, in accordance with the present invention.
Figure 10:
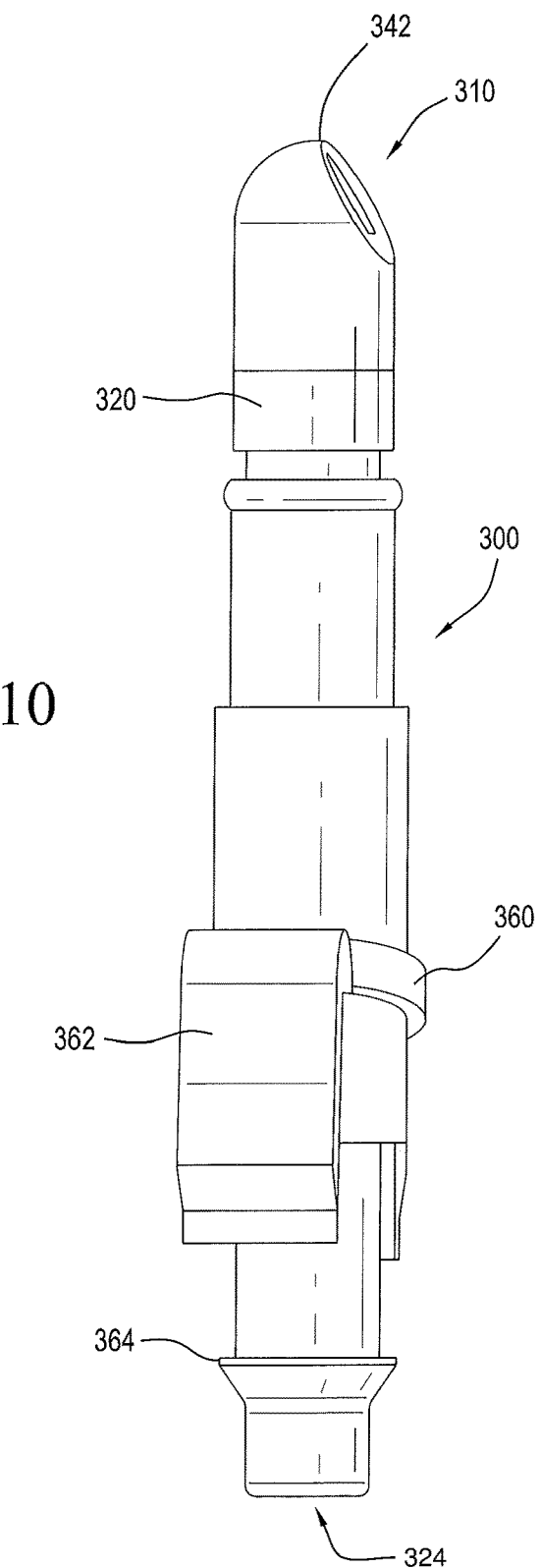
FIG. 10 is a perspective view, in elevation, illustrating the automotive trim mounted spray nozzle assembly of FIGS. 9A and 9B, with the cap member configured for incorporation in or installation with an external trim member, in accordance with the method of present invention.
Figure 11:
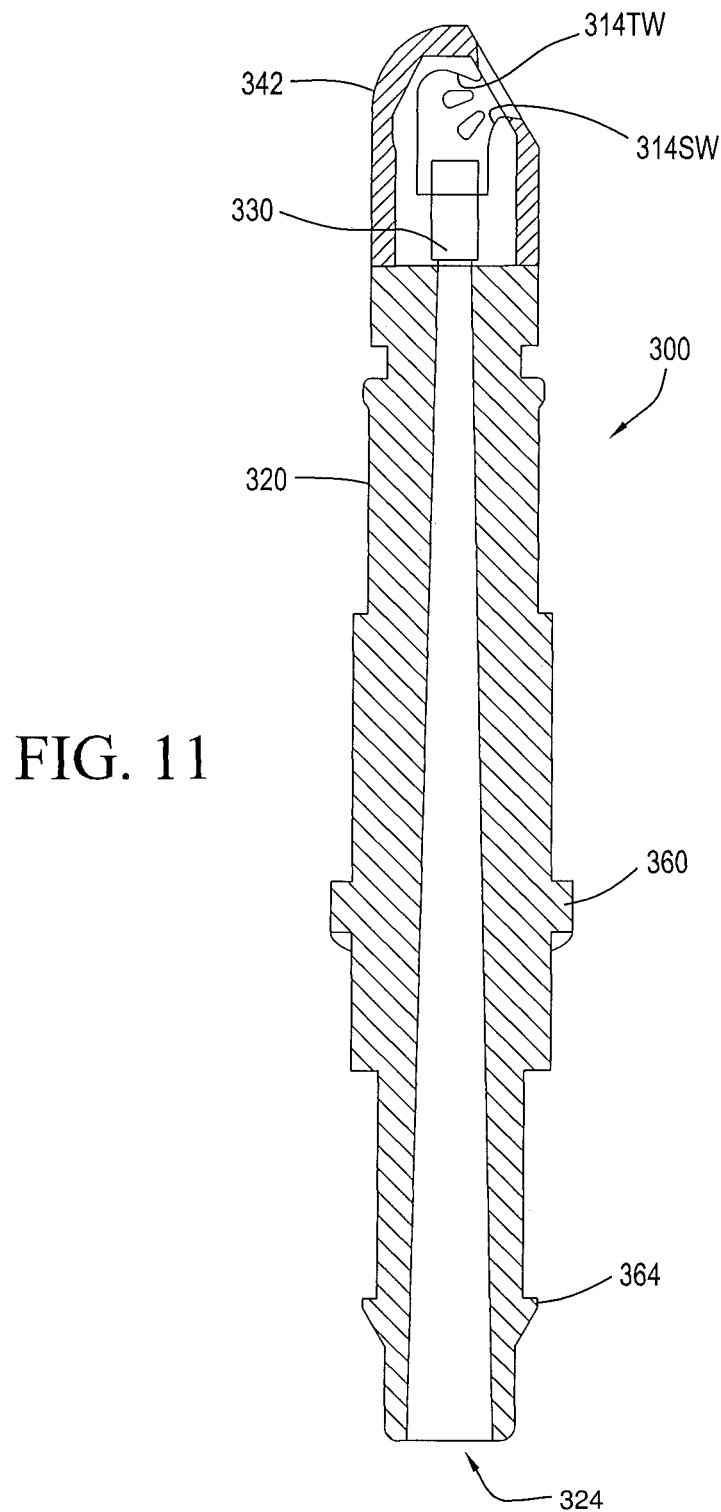
FIG. 11 is a partial cross section, in elevation, internal configuration of the automotive trim mounted spray nozzle assembly of FIGS. 9A, 9B and 10, with the cap member, in accordance with the method of present invention.

Referring particularly to FIGS. 9A and 9B, an automotive trim mounted spray nozzle assembly 300 is configured with a new triple orifice shear outlet insert or compact shear spray nozzle member 310. Fluid spray aiming shear outlet insert 310 is configured for use in a nozzle assembly housing 320 (e.g., as shown in FIGS. 9A-11) which defines a channel 330 that receives and provides boundaries for the fluid paths defined in the shear outlet insert 310. Nozzle assembly 300 is configured with housing 320 which defines a substantially hollow fluid-impermeable structure with an interior lumen 324 in fluid communication with one or more ports or slots 330, each defining a substantially rectangular passage or aperture with smooth interior slot wall surfaces. In a similar manner to slot 230 for housing 220, the interior sidewall surfaces are preferably dimensioned for cost effective fabrication using molding methods and optionally include sidewall grooves positioned and dimensioned to form a "snap fit" with ridges or tabs in a mating shear outlet insert (not shown). Nozzle assembly 300 can be configured to include one or more shear outlet inserts or chips which are dimensioned to be tightly received in and held by the slot 330 defined within the housing 320. When shear outlet insert 310 is fitted tightly within port or slot 330, the nozzle assembly provides a channel for fluid communication between the housing's interior lumen 324 and the exterior of the housing so that fluid entering the housing's interior lumen may be used to generate a flat fan-shaped spray directed distally and aimed by the orientation and configuration of housing 320 which supports and aims shear outlet insert 310.

Referring again to FIGS. 9A and 9B, insert 310 has an end wall which terminates distally at distal end 315D and abuts an angled wall spray orifice defining wall segment in which are defined outlet orifices 317, 318 and 319 which can be configured to aim into any angle between (a) an axially aligned distal spray (along the central axis of lumen 324) and (b) a substantially transverse spray (along a line transverse to the central axis of lumen 324).

Nozzle assembly housing 320 is illustrated in a configuration which can be assembled into an automotive trim bezel or other body mount and has a distally projecting end cap 342 configured as a visually unobtrusive hemispherical bump defined to cover and enclose the insert receiving slot 330. The housing's distally projecting end cap 342 provides an aperture which passes the shear spray which is aimed or oriented by defining the orientation of the housing 320 and insert 310 and so for an insert configured to generate a flat spray with a selected fan angle, the orientation of that flat spray is adjusted by adjusting the orientation of housing 320. Preferably, housing 320 is molded from a suitably tough material such as plastic and includes one or more alignment features 360 or snap-fit retaining tabs 362 on selected exterior surfaces to enable housing 320 to be assembled into an automotive trim piece or body panel (e.g., such as bezel 10). The housing's fluid inlet lumen 324 is preferably configured with a tube-retaining barb fitting 364.

The shear outlet insert or compact shear spray nozzle member 310 of the present invention as illustrated in FIGS. 9A and 9B is an elongated solid member having a planar side opposite a fluid channel side 312 which has fluid channel 314 defined therein. Insert 310 has a proximal end (not shown) which is inserted into housing slot 330 such that the insert's distal end 315D is exposed. When pressurized cleaning fluid is pumped into nozzle assembly inlet lumen 324, shear outlet insert 310 operates on a fluid shearing mechanism resulting in generation of a spray of distally projecting droplets (not shown). Current prototypes of the shear spray circuit or insert 310 of the present invention produce a substantially planar spray with a fan angles from 30 degrees to 120 degrees by generating first, second and third laterally spaced and aimed spray fans from outlet orifices 317, 318 and 319.

The exemplary embodiment of the shear outlet insert 310 as illustrated in FIGS. 9A-11 also has a plurality of sections which cooperate with one another to act upon the flowing fluid passing therethrough to generate a desired spray. The fluid flows from nozzle assembly inlet 324 and into cavity 330, where it is forced to flow along the fluid flow channel 314 defined in insert surface 312 through the sections described below emitted as a spray of fluid droplets from the split or first, second and third outlets 317, 318 and 319. As fluid flows along fluid flow channel 314 from the channel's inlet which receives fluid from and is in fluid communication with housing inlet and lumen 324, the fluid is accelerated in tapered transition region 314T which reduces the cross sectional area of fluid flow channel 314. A shear chamber 314SC is in fluid communication with and receives fluid from tapered transition region 314T and that fluid flows around a first fluid-impermeable inwardly projecting island protuberance 316B and around the opposing channel sidewalls to create first, second and third substantially co-planar sprays from the outlets, and the combined sprays from the outlets 317, 318 and 319 have at least a small overlap and so together generate a relatively evenly distributed spray with a selected fan angle in the range of 30 degrees to 120 degrees.

It will be appreciated by persons having skill in the art that molded compact shear spray nozzle member 310, when used in compact shear spray nozzle assembly 300 provide a molded compact spray head having an open proximal end in fluid communication with a fluid channel or lumen 324 with tapering transition regions having progressively smaller internal lumen cross sectional areas to accelerate washing fluid toward shear-spray generating chamber 314SC with its elongated spray orifice having a first (upper) orifice edge (at the top of throat exit 317 near wall segment 315D) opposing a second orifice edge (at the bottom of throat exit 319). Distal shear-spray generating chamber 314SC also has a first (distal end) concave wall segment 314TW defining a first fluid impingement angle, where that first concave wall segment is defined in the distal end and terminates in the first (top or distal end) spray orifice edge. The distal shear-spray generating chamber 314SC also has a second convex wall segment 314SW defining a second fluid impingement angle, where the second convex wall segment terminates in the second spray orifice edge. The exterior of compact shear spray nozzle member 310 terminates in a distal exterior surface 515D and when cap 342 is installed, the spray orifice generates the outwardly projecting fluid spray fan from the orifice which is split with islands 316A and 316B to define three aligned throat exits 317, 318 and 319.

Having described preferred embodiments of a new and improved nozzle component configuration, it is believed that other modifications, variations and changes will be suggested to those skilled in the art in view of the teachings set forth herein. It is therefore to be understood that all such variations, modifications and changes are believed to fall within the scope of the present invention.

What is claimed is:
1. A compact spray head for use in automotive washer nozzle assembly, comprising:
    a molded compact shear spray nozzle member having an open proximal end in fluid communication with an interior lumen with tapering transition regions having progressively smaller internal lumen cross sectional areas;
    said lumen terminating distally in a distal shear-spray generating chamber having an elongated spray orifice with a first orifice edge opposite a second orifice edge,
    said distal shear-spray generating chamber also having a first concave wall segment defining a first fluid impingement angle, wherein said first concave wall segment terminates in the first spray orifice edge;

said distal shear-spray generating chamber also having a second concave wall segment defining a second fluid impingement angle, wherein said second concave wall segment terminates in the second spray orifice edge; and said molded compact shear spray nozzle member terminating in a distal substantially hemispherical shaped exterior surface and wherein said spray orifice is configured to generate an outwardly projecting fluid spray fan.

2. The compact spray head of claim 1, wherein said spray orifice is defined around a splitter to define first and second aligned throat outlets configured to produce first and second substantially co-planar fan-shaped sprays, with even spray distribution, which is selected from within the range of 30° to 120°.

3. The compact spray head of claim 1, wherein said substantially hemispherical shaped exterior surface has an external diameter of 5 mm.

4. The compact spray head of claim 1, wherein said distal shear-spray generating chamber and said spray orifice are configured to generate sprays in selected spray aim, yaw and roll angles.

5. The compact spray head of claim 2, wherein said substantially hemispherical shaped exterior surface is configured with exterior notch wall segments and said splitter defining said first and second aligned throat outlets.

6. The compact spray head of claim 2, wherein said first and second substantially co-planar fan-shaped sprays are formed having a spray fan angle defined by a height and width of an elliptical orifice as divided by said splitter to define throat exits or spray orifices.

7. The compact spray head of claim 2, wherein the spray has a yaw that is asymmetrical and wherein a first laterally spaced spray orifice has a greater opening than a second laterally spaced spray orifice to produce relatively wide spray angle with a uniform spray that is formed from the combination of a first spray fan from the first laterally spaced spray orifice and a second spray fan from the second laterally spaced spray orifice where the combination of the spray fans does not foam where the two fans meet.

8. A compact shear spray nozzle assembly, comprising:
a molded compact shear spray insert member having a fluid channel with a proximal end, said fluid channel further comprising tapering transition regions having progressively smaller internal fluid channel cross sectional areas;
said fluid channel terminating distally in a distal shear-spray generating chamber having an elongated spray orifice with a first orifice edge opposite a second orifice edge, said distal shear-spray generating chamber also having a first concave wall segment defining a first fluid impingement angle, wherein said first concave wall segment terminates in the first spray orifice edge;
said distal shear-spray generating chamber also having a second concave wall segment defining a second fluid impingement angle, wherein said second concave wall segment terminates in the second spray orifice edge; and
said molded compact shear spray insert member terminating in a distal exterior surface and wherein said spray orifice is configured to generate an outwardly projecting fluid spray fan.

9. The compact shear spray nozzle assembly of claim 8, wherein said spray orifice is defined around an inwardly projecting splitter positioned to define first and second aligned throat outlets configured to produce first and second substantially co-planar fan-shaped sprays, with even spray distribution, which is selected from within the range of 30° to 120°.

10. The compact shear spray nozzle assembly of claim 8, further comprising a nozzle assembly housing that defines an interior lumen with at least one slot and an exterior surface wherein said insert member is configured to be installed within said at least one slot, said nozzle assembly housing has a distal end from which said sprays project having an external diameter of 5 mm.

11. The compact shear spray nozzle assembly of claim 8, wherein said distal shear-spray generating chamber and said spray orifice are configured to generate sprays in various spray aim, yaw and roll angles.

12. The compact shear spray nozzle assembly of claim 9, wherein the spray has a yaw that is asymmetrical and wherein a first laterally spaced spray orifice has a greater opening than a second laterally spaced spray orifice to produce a relatively wide spray angle with a uniform spray that is formed from the combination of a first spray fan from the first laterally spaced spray orifice and a second spray fan from the second laterally spaced spray orifice where the combination of the spray fans does not foam where the two fans meet.

13. The compact shear spray nozzle assembly of claim 9, wherein said shear chamber and said spray orifice are defined around a second inwardly projecting splitter positioned to define first, second and third aligned throat outlets configured to produce first, second and third substantially co-planar fan-shaped sprays, with even spray distribution, which is selected from within the range of 30° to 120°.

14. The compact shear spray nozzle assembly of claim 13, wherein the spray has a yaw that is asymmetrical and wherein a first laterally spaced spray orifice has a greater opening than a second laterally spaced spray orifice to produce a relatively wide spray angle with a uniform spray that is formed from the combination of a first spray fan from the first laterally spaced spray orifice and a second spray fan from the second laterally spaced spray orifice where the combination of the spray fans does not foam where the two fans meet.

15. The compact shear spray nozzle assembly of claim 14, wherein said insert member's exterior surface is defined by a fluid impermeable cap member which encloses said insert member.

* * * * *